United States Patent [19]

Matsuura et al.

[11] 4,385,351
[45] May 24, 1983

[54] MULTIPROCESSOR SYSTEM WITH APPARATUS FOR PROPAGATING CACHE BUFFER INVALIDATION SIGNALS AROUND A CIRCULAR LOOP

[75] Inventors: Tsuguo Matsuura, Hadano; Shunichi Torii, Kokubunji; Tsuguo Shimizu, Hadano, all of Japan

[73] Assignee: Hitachi, Ltd., Tokyo, Japan

[21] Appl. No.: 136,492

[22] Filed: Apr. 3, 1980

[30] Foreign Application Priority Data

Apr. 6, 1979 [JP] Japan .................. 54-41118

[51] Int. Cl.³ .................. G06F 7/02; G06F 11/00; G06F 15/00; G06F 15/16
[52] U.S. Cl. .................. 364/200; 365/189; 371/31; 371/38
[58] Field of Search ... 364/200 MS File, 900 MS File; 365/189, 200; 371/9, 30, 31, 38

[56] References Cited

U.S. PATENT DOCUMENTS

| | | | |
|---|---|---|---|
| 3,618,040 | 11/1971 | Iwamoto et al. | 364/200 |
| 3,631,405 | 12/1971 | Hoff et al. | 364/200 |
| 3,699,529 | 10/1972 | Beyers et al. | 364/200 |
| 3,735,360 | 5/1973 | Anderson et al. | 364/200 |
| 3,771,137 | 11/1973 | Barner et al. | 364/200 |
| 3,806,885 | 4/1974 | Moore et al. | 364/200 |
| 3,889,237 | 6/1975 | Alferness et al. | 364/200 |
| 3,958,226 | 5/1976 | Kuroda et al. | 364/200 |
| 4,007,450 | 2/1977 | Haibt et al. | 364/200 |
| 4,056,844 | 11/1977 | Izumi et al. | 364/200 |
| 4,142,234 | 2/1979 | Bean et al. | 364/200 |
| 4,264,953 | 4/1981 | Douglas et al. | 364/200 |
| 4,298,928 | 11/1981 | Etoh et al. | 364/200 |
| 4,314,331 | 2/1982 | Porter et al. | 364/200 |
| 4,322,795 | 3/1982 | Lange et al. | 364/200 |

*Primary Examiner*—James D. Thomas
*Assistant Examiner*—Archie E. Williams, Jr.
*Attorney, Agent, or Firm*—Antonelli, Terry & Wands

[57] ABSTRACT

This data processing system includes a main memory which is shared by a plurality of central processor units (CPUs) which are also coupled in cascade in a closed circular path. Each CPU has a cache buffer memory and two sets of transfer registers for receiving and transmitting cancel request signals which identify cache data which is no longer valid. Each CPU's receiving register subsystem includes circuitry for invalidating cache buffer data which has been updated or rewritten in main memory by another CPU in the loop. Each CPU's transmitting register subsystem includes circuitry for inhibiting the transmittal of a cancel request signal if the next CPU in the circle is the same one which originated the particular cache invalidation signal. Circuitry is also provided for propagating a cancel request signal around the loop in opposite directions simultaneously.

24 Claims, 4 Drawing Figures

MULTIPROCESSOR SYSTEM WITH APPARATUS FOR PROPAGATING CACHE BUFFER INVALIDATION SIGNALS AROUND A CIRCULAR LOOP

BACKGROUND OF THE INVENTION

This invention relates to a data processing system of the multi-processor type, having a plurality of central processing units.

In a data processing system of the multi-processor type configuration with its plural central processing units interconnected functionally with one another, all the central processing units share a main memory in the system with one another. Each central processing unit is furnished with a high-speed buffer memory having a smaller capacity. The buffer memories are allowed to take in and store therein parts of the data stored in the main memory. By using the data transferred to the buffer memories, the access time for data can be shortened since if one of the central processing units needs a piece of data stored in both the main memory and the associated buffer memory, it can obtain the desired data by making an access to the high-speed buffer memory, not directly to the main memory. If a central processing unit finds that a desired piece of data is not present in the associated buffer memory, it makes an access to the main memory to obtain the necessary data and also to transfer the same data into the associated buffer memory.

The buffer memories are thus dedicated to the respective central processing units while the main memory is shared by all the central processing units. To run such a multi-processor type data processing system under the control of the same program, it is necessary for every central processing unit to be able to use data belonging to another as well as common data stored in the main memory. Each central processing unit makes access to the main memory, independently of the others. Accordingly, if a central processing unit performs the writing of data into the main memory to replace a portion of the old data by new data, the other central processing units cannot use the correct, renewed data when their buffer memories store therein the data equal to the replaced portion of the old data. This problem can be solved by the means described in detail in, for example, U.S. Pat. No. 3,618,040; Japanese Patent Publication No. 12020/74; and Japanese Patent Publication No. 1611/78. According to these prior art systems, the central processing unit which has written data onto the main memory, sends the address of the written data to all the other central processing units. Each of the other central processing units checks whether its buffer memory stores data having the received address. If the buffer stores the data having the address in question, the data is invalidated to prevent a misuse of data.

In these prior art systems, therefore, each central processing unit is provided with interface circuits for the respective central processing units to effect address transfer in case of rewriting occurring in the main memory. If this system uses four central processing units, the number of the interface circuits to be used is determined depending on the four units. Therefore, when this system is run with only two of the central processing units in operation, the interface circuits for the two units at rest are superfluous.

If a data processing system is optimized (or standardized) using interface circuits corresponding to the greatest number of central processing units to be used in the case where the system is to be operated as a single processor type system or a multi-processor type system, then some of the interface circuits become superfluous in some cases. This is not preferable in view of cost performance. In the case of a general-purpose computer having a large capacity, for example, it is operated most often as a two multi-processor or a single processor type data processing system. It is therefore useful to design a data processing system in such a manner that it can also operate as a three or four processor system while it is optimized as a single or two processor system.

SUMMARY OF THE INVENTION

It is therefore the object of this invention to provide a data processing system which has a standardized structure and can also operate as a multi-processor system with high cost performance.

According to the features of the present multi-processor system, a plurality of central processing units are connected together in a circular path by a specific connecting means; the central processing unit which has rewritten a part of the data in the main memory, sends the address of the rewritten data through the connecting means to the other central processing units; and if each of the other central processing units finds that its associated buffer memory stores therein data having the same address as the received one, the stored data is invalidated.

According to this invention, since the plural central processing units are connected in a circle, the data processing system having a standardized structure can operate as a multi-processor type system having a variety of numbers of central processing units and the coincidence of data between the main memory and the buffer memories proper to the central processing units can be secured.

Other objects, features and advantages of this invention will be apparent from the following description taken in conjunction with the accompanying drawings.

DESCRIPTION OF THE PREFERRED EMBODIMENTS

Now, this invention will be described in detail by way of an embodiment.

Figure 1:
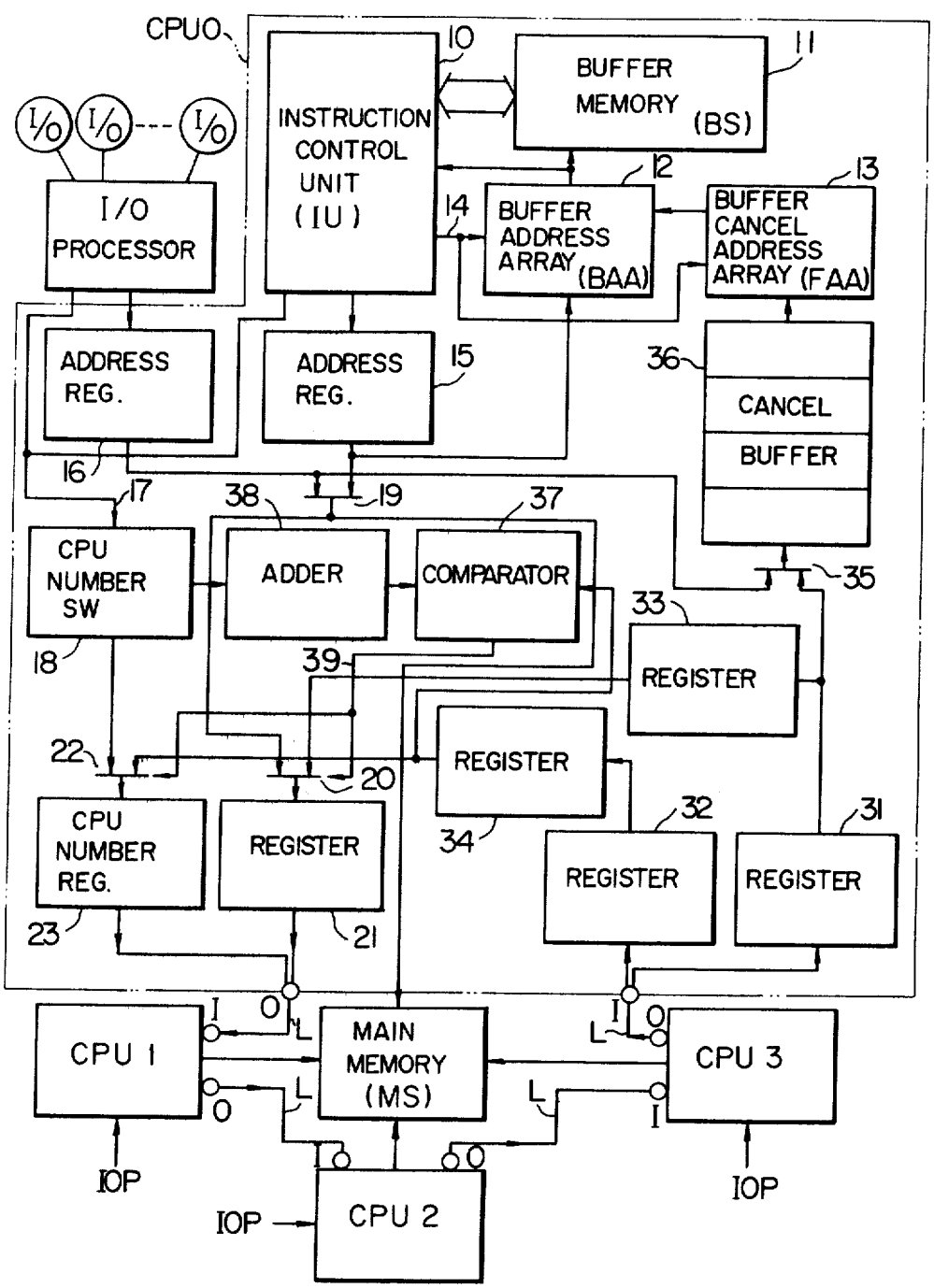
FIG. 1 shows in block diagram a data processing system as an embodiment of this invention.

FIG. 1 shows a data processing system of the four-processor type as an embodiment of this invention, comprising four central processing units. Four central processing units CPU 0–3 are connected to and therefore share a main memory MS. Each central processing unit CPU is connected to an input/output processor IOP, which is connected to and controls plural input/output devices I/O's. The central processing units CPU 0–3 have the same constitution and only the CPU 0 will be described in detail. In addition, in the circuit shown in FIG. 1, only those parts of the circuit are shown which are involved in the store requesting operation associated with the main memory MS, which operation is the central concern of this invention. p In the CPU0, a buffer memory BS11 has a smaller capacity and a higher speed than the main memory, and stores therein those portions of data stored in the main memory which are most often used by the CPU0. The address in the main memory MS of the data stored in the buffer memory BS11 is stored in a buffer address array BAA12. By the inspection of the content of the buffer address array BAA12, it can be determined whether requested data is stored in the buffer memory BS11. And, if the desired data is stored in the buffer memory BS11, the address in the buffer memory BS11 of the desired data is also determined to use the same data. A buffer cancel address array FAA13 has the same constitution as the buffer address array BAA12 and stores the address in the MS of the data stored in the BS11. When a block of data is transferred from the MS to the BS11 and stored in the BS11, an instruction control unit IU10 sends through a line 14 the address in the MS of the data stored in the BS11 to the BAA12 and the FAA13. The function of the buffer cancel address array FAA will be described later.

When a store request is generated in the CPU0, the IU10 delivers the address associated with the request to an address register 15 and the address is set in the address register 15. Also, when the input/output processor IOP generates a store request, the address associated therewith is set in an address register 16. The addresses stored in the address registers 15 and 16 are sent via a selector 19 to the main memory MS and the desired data is thus sent and stored at these addresses (the associated data line is omitted). The store request address sent from the IU10 and set in the address register 15 is also sent to the buffer address array BAA12. The BAA12 compares the received address with the addresses which it stores to check whether the data corresponding to the address sent from the register 15 is stored in the buffer memory BS11. If the data is stored in the BS11, the IU10 writes data in the BS11 in response to the signal from the BAA12. On the other hand, if the request address data is not stored in the BS11, no data is written in the BS11. Since the IOP never utilizes the BS11, the store request address in the address register 16 is not sent to the buffer address array BAA12, but is sent to and stored in a selector 35 described later since non-coincidence is caused between the data in the MS and the data in the BS.

The store request addresses stored in the address registers 15 and 16 are also transferred via selectors 19 and 20 to a register 21. At the time of a store request, the IU10 and the IOP send signals to a CPU number switch 18 through a line 17 so that a CPU number is delivered via a selector 22 to a CPU number register 23. The CPU number switch 18 delivers the number of the CPU to which it belongs and therefore delivers an output "0". The address and the CPU number stored respectively in the registers 21 and 23 are delivered as a pair of cancel requests from an output terminal O. The output terminal O of one CPU is connected by a connecting line L with the input terminal I of an adjacent CPU and the four CPU's are interconnected in a circle. A cancel request delivered from the output terminal O of the CPU0 is transferred to the CPU1. And the received cancel request is further transferred to the CPU2 and to the CPU3. Thus, all the CPU's perform the same canceling operation described later with the CPU0.

The selectors 19, 20, 22 and 35, when receiving inputs simultaneously, exhibit a predetermined preference in the order of delivering outputs, delivering their outputs in the predetermined order.

The input terminal I of the CPU0 receives an address and a CPU number as a cancel request from the output terminal O of the CPU3. The address and the CPU number received at the input terminal I are set respectively in the registers 31 and 32. The address set in the register 31 is transferred to the register 33 and also set in a cancel buffer 36 via the selector 35. The store request address transferred from the IOP to the register 16 is also set in the cancel buffer 36. The cancel buffer 36 may be, for example, a four-stage shift register, in which an address set in its lowermost stage is successively shifted up in the upper stages to be finally transferred to the buffer cancel address array FAA13. The FAA13 checks whether it stores an address equal to the address sent from the cancel buffer 36, and if it stores the coincident address, the address is invalidated and also the corresponding address in the BAA12 is invalidated. This means that the corresponding data is the BS11 is invalidated, since the BAA is the directory for the BS. The significance of the provision of the FAA13 is disclosed in the U.S. Pat. No. 4,056,844.

Namely, since the FAA13 serves to check the coincidence between the address as its content and the address sent from the cancel buffer 36, the IU10 can meanwhile use the BAA12 without disturbing the ordinary processing. This secures high performance. In this case, the FAA13 and the cancel buffer 36 may be omitted. Accordingly, the output of the selector 35 is supplied directly to the BAA12 and the BAA12 alone performs the above cancelling operation.

The CPU number set in the register 32 is transferred to the register 34 in synchronism with the instant when the address set in the register 31 is transferred to the register 33. The CPU number set in the register 34 is sent to a comparator 37. The comparator 37 always receives also the output of an adder 38, irrespective of the arrival of the signal on the line 17, the output of the adder 38 being equal to the CPU number from the CPU number switch 18 plus unity (1). When the comparator 37 finds a coincidence between the CPU number from the register 34 and the output of the adder 38, i.e. the CPU number from the switch 18 plus 1, the comparator 37 identifies the completion of cancellation processing, delivering an output signal to the selectors 20 and 22 through a line 39 to prevent the address and the CPU number set respectively in the registers 33 and 34 from being transferred to the registers 21 and 23. That is, the delivery of a coincidence output by the comparator 37 in the CPU0 indicates that the CPU number set in the register 34 is "1" which has been generated by the CPU1 and circulated via the CPU2 and CPU3. Accordingly, the selectors 20 and 22 are closed so that the address and the CPU number generated by the CPU1 and set respectively in the registers 33 and 34 are prevented from being transferred to the CPU1. Thus, the present cancelling request vanishes. When the comparator 37 finds a non-coincidence, the contents of the registers 33 and 34 are transferred via the selectors 20 and 22 to the registers 21 and 23 and further to the CPU1.

In this way, an address generated for a store request in one CPU is transferred through the circular signal path to another CPU. A cancel request generated by the CPU0 is transferred to the CPU1, CPU2 and CPU3 successively. In like manner, a cancel request generated by the CPU1 is successively transferred to the CPU2, CPU3 and CPU0; a cancel request by the CPU2 to the CPU3, CPU0 and CPU1; and a cancel request by the CPU3 to the CPU0, CPU1 and CPU2. Each CPU, having received such a cancel request, performs such a cancelling operation as described above.

According to the data processing system as an embodiment of this invention, shown in FIG. 1, high cost performance can be attained even with any desired number of central processing units each having a standardized constitution. For example, if the output terminal O of the CPU1 is connected with the input terminal I of the CPU0 to form a circular signal path, the system can be operated as a two-processor type data processing system. Moreover, if CPU4, CPU5, . . . , and CPU(n−1) are added in the system and if the output terminal O of CPU(k−1) is connected with the input terminal I of CPUk, where k=1, 2, . . . , n−1, with the output terminal O of the CPU(n−1) connected with the input terminal I of the CPU0, then the system can operate as a n-processor type data processing system. In every case, the interface circuit for a cancel request is not superfluous and is sufficient to be required. However, with the increase in the number of CPU's, there is a chance of a deadlock condition being generated and a problem of the increase in the time taken for a cancel request to be transferred from the initial CPU to the last CPU. The deadlock condition is generated if a cancel request is prevented from advancing through the signal circulating path since all the registers constituting the circular path are filled with cancel requests, although it must continue to advance through the path until the cancel requests in all the registers have vanished. The problem of deadlock condition can be solved if the existence of more than one vacant register is logically secured in the signal circulating path. For example, in the case of the circuit shown in FIG. 1, when one CPU injects a cancel request into the circular path, it is only necessary to secure both the vacancy of the register 21 of the CPU and the vacancy of one of the registers 31 and 33 in the CPU0.

Figure 2:
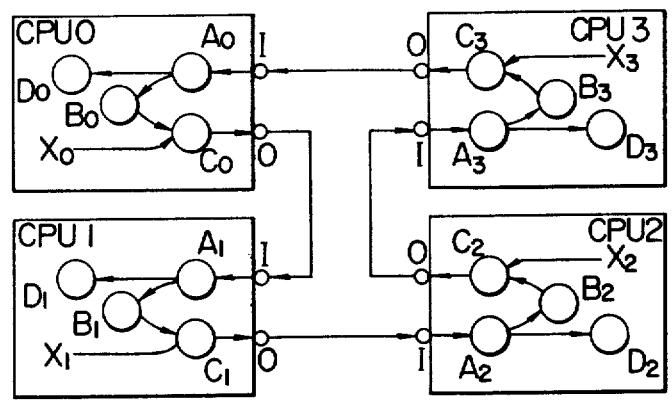
FIG. 2 schematically shows a canceling interface used in the circuit shown in FIG. 1.

FIG. 2 schematically shows the cancel interface shown in FIG. 1. In FIG. 2, each of $A_0$–$A_3$ designates a combination of the registers 31 and 32; each of $B_0$–$B_3$ a combination of the registers 33 and 34; each of $C_0$–$C_3$ a combination of the registers 21 and 23 each of $D_{0-3}$ the cancel buffer 36; and each of $X_0$–$X_3$ a cancel request generated in each of the CPU0–CPU3.

First, cancel requests $X_0$–$X_3$ are set respectively in the registers $C_0$–$C_3$. During the next cycle, the cancel requests set in the registers $C_0$–$C_3$ are transferred respectively to the registers $A_1$–$A_0$, as seen from FIG. 2. If the cancel requests $X_0$–$X_3$ still exist in this stage, these requests $X_0$–$X_3$ are set as new cancel requests in the registers $C_0$–$C_3$, respectively. In this way, the cancel requests are circulated as indicated by arrows through the circular path.

Figure 3:
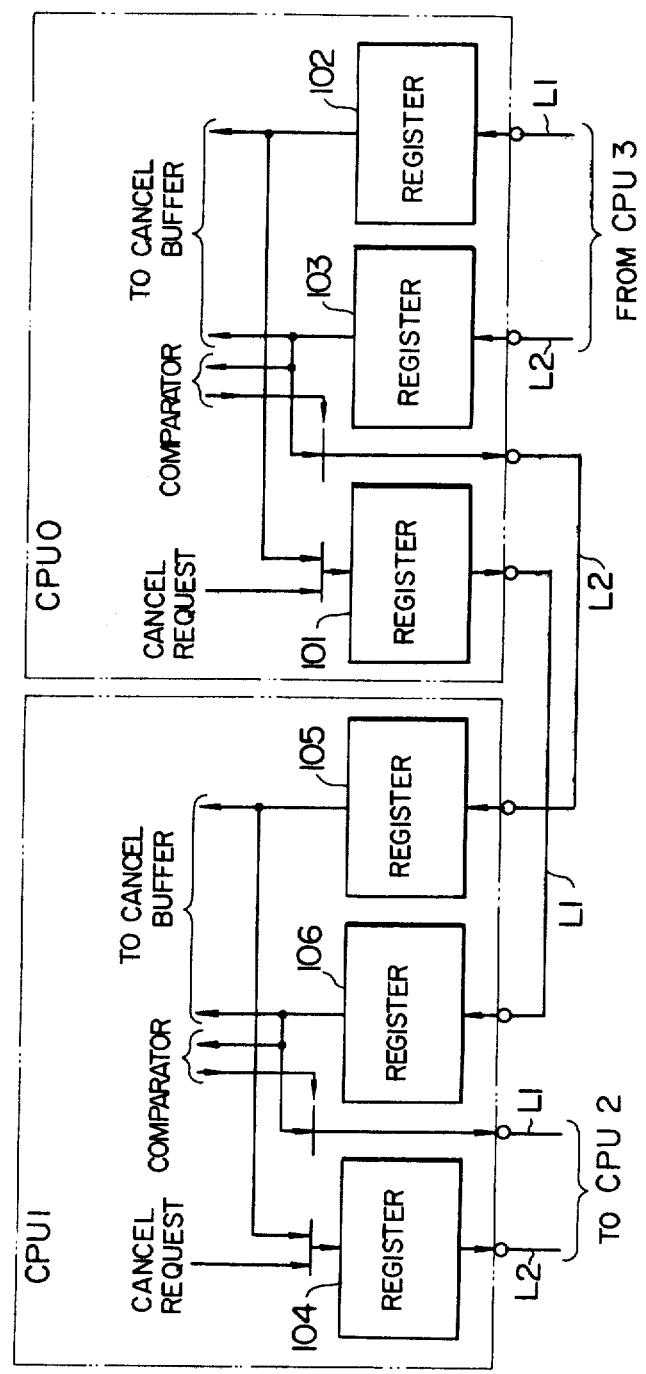

FIG. 3 shows another embodiment of this invention. In FIG. 3 are shown only those portions of a data processing system which are different from the corresponding portions of the system shown in FIG. 1 and which constitute only the interface section for address transfer. In FIG. 3, a CPU number and its associated address are referred to as a cancel request. This embodiment is characterized in that CPU's are interconnected with the another by two connecting lines $L_1$ and $L_2$. The cancel request generated by the CPU0 is set in a register 101 and then transferred through the connecting line $L_1$ to a register 106 in the CPU1. The cancel request transferred from the CPU3 is set in registers 102 and 103 to be supplied to the cancel buffer. The cancel request set in the register 102 is sent through the register 101 and the connecting line $L_1$ to the CPU1 while the cancel request set in the register 103 is transferred through the connecting line $L_2$ to the register 105 in the CPU1. The cancel request generated by the CPU1 is set in a register 104 connected with the connecting line $L_2$. The cancel request generated by the CPU2 is sent through the connecting line $L_1$ and the cancel request generated by the CPU3 is sent through the connecting line $L_2$. Therefore, the cancel requests generated by the CPU0 and CPU2 are sent through a circular path formed of the connecting line $L_1$ while the cancel requests generated by the CPU1 and CPU3 are sent through a circular path formed of the connecting line $L_2$.

With the constitution of the embodiment shown in FIG. 3, more cancel requests are allowed to be circulated through the circular path than with the constitution of the previous embodiment and this embodiment is more adapted for a multi-processor type data processing operation.

Figure 4:
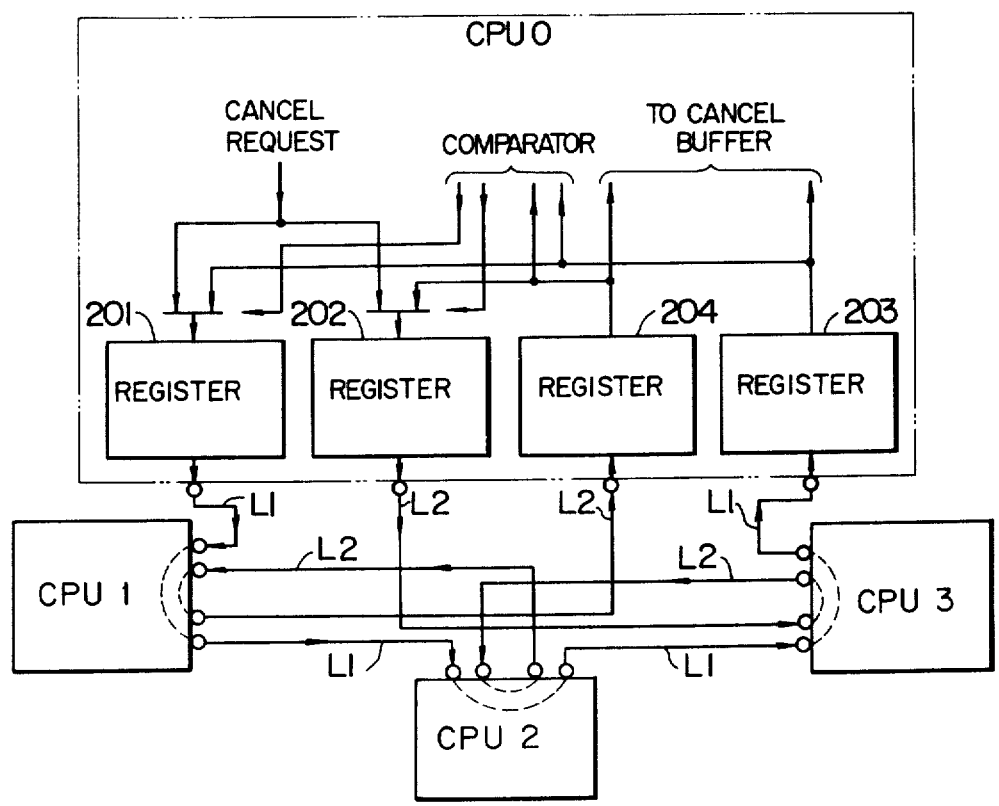
FIGS. 3 and 4 show in block diagram data processing systems as other embodiments of this invention.

FIG. 4 shows still another embodiment of this invention, which is characterized in that the connecting line $L_1$ forms a counterclockwise circular path while the connecting line $L_2$ serves as a clockwise circular path and that the cancel request generated by each CPU is sent through the two circular paths in the opposite directions. The cancel request generated by the CPU0 is set in both the registers 201 and 202. The cancel request in the register 201 is transferred through the connecting line $L_1$ to the CPU1 while the cancel request in the register 202 is transferred through the connecting line $L_2$ to the CPU3. The cancel request generated by the CPU3 is transferred through the connecting line $L_1$ to the register 203 and the cancel request generated by the CPU1 is transferred through the connecting line $L_2$ to the register 204. The cancel requests in the registers 203 and 204 are sent to the cancel buffer and also transferred to the registers 201 and 202. The CPU1–CPU3 have the same constitution as the CPU0. The cancel request generated by the CPU0 and delivered onto the connecting line $L_1$ is transferred to the CPU1 and then to the CPU2 sequentially. This cancel request is prevented from being transferred from the CPU2 to the CPU3. The cancel request generated by the CPU0 and delivered onto the connecting line $L_2$ is transferred to the CPU3 and there prevented from being transferred further to the CPU2. The cancel requests generated by the other CPU's are also transferred in similar modes.

With this constitution shown in FIG. 4, the cancel request can be transferred from one CPU to another without any appreciable delay even if the system comprises many central processing units.

What we claim is:

1. A data processing system comprising
a main memory;
three or more central processing units, each unit having buffer memory means for storing selected portions of the data stored in said main memory; and
connecting means for connecting said central processing units in cascade in a circular path;
each of said central processing units including control means for supplying a cancel request signal which identifies a data portion memory address via said connecting means to all the other central processing units each time it rewrites a part of the data in said main memory, first transfer means responsive to said control means for transferring a cancel request signal received from another central processing unit to the next central processing unit via said connecting means, said control means including means for preventing a cancel request signal generated by one of said central processing units from being transferred back to the same unit, and second transfer means for transferring said cancel request signal received from another unit via said connecting means to said buffer memory means, and said buffer memory means includes means for invalidating the data held therein in accordance with said cancel received cancel request signal.

2. A data processing system as claimed in claim 1, wherein said means for supplying said cancel request signal via said connecting means includes means for including in said cancel request signal the CPU number of the central processing unit which has generated said cancel request signal.

3. A data processing system as claimed in claim 2, wherein said control means in each central processing unit includes comparator means for comparing its CPU number with the CPU number received via said connecting means and means responsive to said comparator means for preventing a cancel request signal from being transferred to the next central processing unit via said connecting means when the CPU number identified in said cancel request signal designates said next central processing unit.

4. A data processing system as claimed in claim 2, wherein said first transfer means in each central processing unit further includes plural registers which are coupled in cascade by said connecting means for storing information comprising a CPU number and a memory address constituting a cancel request, and said control means in each central processing unit includes means for effecting synchronous transfer of information from the plural registers in one central processing unit to the next central processor unit around said circular path.

5. A data processing system comprising
a main memory;
three or more central processing units sharing said main memory, each unit including therein buffer memory means for storing selected portions of the data stored in said main memory, an input terminal, an output terminal, means for sending a cancel request signal to said output terminal in response to the operation of writing data in said main memory by said unit, first transfer means responsive to a cancel request signal at said input terminal for selectively transferring said cancel request signal to said output terminal said second transfer means for transferring a cancel request signal at said input terminal to said buffer memory means; and
connecting means for connecting said plural central processing units in cascade in a circle in such a manner that the output terminal of one unit is connected to the input terminal of another unit so as to cause coupling of said cancel request signal from one unit to another sequentially in accordance with the operation of said first transfer means in each central processor unit.

6. A data processing system as claimed in claim 5, wherein said buffer memory means includes means for invalidating designated data stored therein in accordance with the cancel request signal received from said second transfer means.

7. A data processing system as claimed in claim 5 or 6, wherein said cancel request signal designates the address in said main memory of the rewritten portion of data.

8. A data processing system as claimed in claim 7, wherein said cancel request signal further designates the number of the central processing unit which has generated said cancel request signal.

9. A data processing system as claimed in claim 5 or 6, wherein said first transfer means includes means for preventing a cancel request signal from being transferred back to the central processing unit which has generated said cancel request signal.

10. A data processing system as defined in claim 8, wherein said first transfer means in each central processing unit includes therein comparator means for comparing its number with the number sent thereto through said first connecting means and said first connecting means includes means for preventing the transfer of a cancel request signal in accordance with the output of said comparator means.

11. A data processing system as claimed in claim 8, wherein said first transfer means comprises a plurality of registers connected in cascade and means for transferring an address and its associated CPU number identified by a cancel request signal from one central processing unit to the next via said connecting means.

12. A data processing system as claimed in claim 1, wherein said connecting means comprises first and second connecting means which are independent of each other, said control means being connected to supply a cancel request signal selectively to one or the other of said first and second connecting means.

13. A data processing system as claimed in claim 1, wherein said connecting means comprises first and second connecting means which are independent of each other and which connect said central processing units together with an opposite signal transfer direction, said control means being connected to supply a cancel request signal to both said first and second connecting means simultaneously.

14. A data processing system comprising
a main memory for storing a plurality of data items at respective memory address locations;
a plurality of central processing units connected to said main memory, each unit including instruction control means for reading out selective data items from and for re-writing selective data items in said main memory through application of memory address signals thereto, buffer memory means for storing selected data items which are also stored in said main memory, buffer address means for storing the memory addresses of all valid data items stored in said buffer memory means, means for generating a cancel request signal to be sent to all of the other central processing units in response to said instruction control means re-writing a data item in said main memory, means responsive to said cancel request signal for invalidating a data item stored in said buffer memory means which corresponds to a re-written data item in said main memory, and transfer means responsive to receipt of a cancel request signal from one central processing unit for sending that same cancel request signal to another central processing unit including means for forwarding the received cancel request signal to said invalidating means; and
connecting means for connecting all of said central processing units in cascade in a circular path along which said cancel request signals may be passed from the cancel request signal generating means and the transfer means in one central processing unit to the transfer means in another central processing unit in a sequential manner;

wherein each central processing unit includes preventing means for preventing a cancel request signal generated by one of said central processing units from being sent back to the same unit.

15. A data processing system as claimed in claim 14, wherein said central processing units are each assigned a respective CPU number indicative of the position of the central processing unit along said circular path and wherein said cancel request signal includes the CPU number of the central processing unit which has generated that signal, said preventing means including comparator means for comparing the CPU number in a received cancel request signal with the CPU number of the next central processing unit along said circular path and inhibiting means for inhibiting said transfer means from transferring said cancel request signal to said next central processing unit via said connecting means when said comparator means indicates that the two CPU numbers which it is comparing are the same.

16. A data processing system as claimed in claim 14, wherein said central processing units are each assigned a respective CPU number and wherein said cancel request signal includes the CPU number of the central processing unit which has generated that signal, said preventing means including number producing means for producing a signal indicating the CPU number of the next central processing unit to receive said cancel request signal along said circular path, comparator means for comparing the signal produced by said number producing means with the CPU number in a received cancel request signal and for producing an output to enable said transfer means to send said received cancel request signal to said next central processing unit only when a non-comparison condition is detected.

17. A data processing system as claimed in claims 15 or 16, wherein said means for generating a cancel request signal in each central processing unit includes a CPU number generator for generating the CPU number of that central processing unit and means for supplying the address of a re-written data item in said main memory, and said transfer means includes input register means connected to said connecting means for receiving from another central processing unit and storing a cancel request signal, output register means connected to said connecting means for storing and supplying a cancel request signal to another central processing unit and switching means responsive to said comparator means for selectively connecting said output register means to said input register means or to said cancel request signal generating means.

18. A data processing system as claimed in claim 14, wherein said transfer means includes input register means connected to said connecting means for receiving from another central processing unit and storing a cancel request signal, output register means connected to said connecting means for storing and supplying a cancel request signal to another central processing unit, and transfer control means for selectively connecting said output register means to said input register means or to said cancel request signal generating means.

19. A data processing system as claimed in claim 18, wherein said transfer control means includes said preventing means.

20. A data processing system as claimed in claim 18, wherein said connecting means comprises first and second connecting means which are independent of each other, said control means being connected to supply a cancel request signal selectively to one or the other of said first and second connecting means.

21. A data processing system as claimed in claim 18, wherein said connecting means comprises first and second connecting means which are independent of each other and which connect said central processing units together with an opposite signal transfer direction, said control means being connected to supply a cancel request signal to both said first and second connecting means simultaneously.

22. A data processing system as claimed in claim 18, wherein each cancel request signal includes a CPU number portion and an address portion indicating the address of a re-written data item in said main memory, said input register means including first and second registers for storing the CPU number portion and the address portion of a cancel request signal received from said connecting means, means for supplying the address stored in said second register to said invalidating means and means for supplying the CPU number stored in said first register to said control means.

23. A data processing system as claimed in claim 22, wherein said transfer control means includes said preventing means.

24. A data processing system as claimed in claim 23, wherein said central processing units are each assigned a respective CPU number indicative of the position of the central processing unit along said circular path and wherein said cancel request signal includes the CPU number of the central processing unit which has generated that signal, said preventing means including comparator means for comparing the CPU number in a received cancel request signal with the CPU number of the next central processing unit along said circular path and inhibiting means for inhibiting said transfer means from transferring said transfer request signal to said next central processing unit via said connecting means when said comparator means indicates that the two CPU numbers which it is comparing are the same.

* * * * *